March 9, 1954  D. A. HANSARD ET AL  2,671,832
INERTIA OR IMPACT OPERATED DEVICE
Filed March 1, 1949

INVENTORS:
D. A. HANSARD
N. G. BENNETT
By Ben. J. Chaney
THEIR ATTORNEY

Patented Mar. 9, 1954

2,671,832

UNITED STATES PATENT OFFICE 2,671,832

INERTIA OR IMPACT OPERATED DEVICE

Douglas A. Hansard, Rowlands Castle, and Neil Gibson Bennett, Staines, England, assignors of one-half to Graviner Manufacturing Company Limited, London, England, a British company, and one-half to Wilkinson Sword Company Limited, London, England, a British company Application March 1, 1949, Serial No. 79,044

8 Claims. (Cl. 200—61.53)

This invention relates to improvements in inertia or impact operated devices of the character employed for controlling electric switches, automatic fire preventing appliances and the like upon craft and vehicles.

Inertia element or impact actuated devices have been used upon aircraft for operating fire preventing appliances when the aircraft is involved in a crash or heavy landing but owing to the vibrational effects to which such devices are subject, when mounted upon any part of the aircraft structure, difficulties are experienced in obtaining reliable operation of such devices.

If, for example, an inertia actuated device is set to operate at a predetermined value of deceleration, the value of deceleration or g at which the device will actually operate, when it is vibrated at given frequencies and amplitudes of vibration, is lower than the predetermined setting and, consequently, inadvertent operation of the device and the fire preventing appliances might be caused with disastrous results to the aircraft.

To reduce the vibrational effects upon inertia element operated devices it has been proposed to mount a sliding slug or other member in a guide tube or conduit, the slug being arranged to move in the direction of flight of the aircraft if impact is applied thereto in this direction.

In one known construction the slug is mounted upon a plurality of bowed leaf springs, the friction of which in the guide tube enables the devices to be set to operate at predetermined values of g, and in another known construction the slug is mounted by means of thin diaphragm springs which support the slug without friction in the guide tube or other mounting means. When impact or deceleration is applied to the slug in the requisite direction the inertia of the slug overcomes the tension of the diaphragm springs causing these to snap over the dead centre whereby closure of an electric circuit or the like is effected.

The present invention relates to improvements in the type of impact operated device comprising a movable slug mounted in a guide tube in which it is retained by the action of spring means, and the object of the invention is to provide a device of this kind having means for readily regulating the setting at which the slug will move when deceleration or impact is applied thereto in the appropriate direction.

The invention will now be described with reference to the accompanying drawings, which show one form of the invention by way of example and in which.

Figure 1:
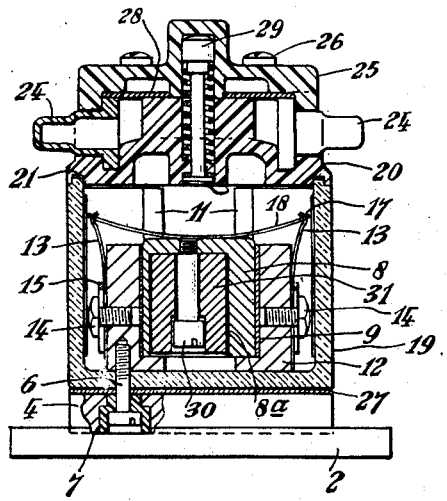
Figure 1 is a sectional view of the mechanism of the appliance shown in the normal position.

Referring now to the drawings, numeral 2 denotes a mounting base plate of circular or rectangular shape provided with bolt holes 3, whereby the appliance can be mounted, for example on a part of an aircraft structure.

Numeral 4 denotes a mounting plate for the mechanism which is secured to part 2 by screw and stud means 5 (Fig. 2), and to which the mechanism of the appliance is secured by means of screws 6 (Fig. 1), which engage insulation spacing sleeves 7 mounted in part 4 so as to prevent electrical contact between a metallic part of the mechanism and parts 4 and 2 which are of metal and which have therefore electrical contact with the aircraft structure.

Figure 2:
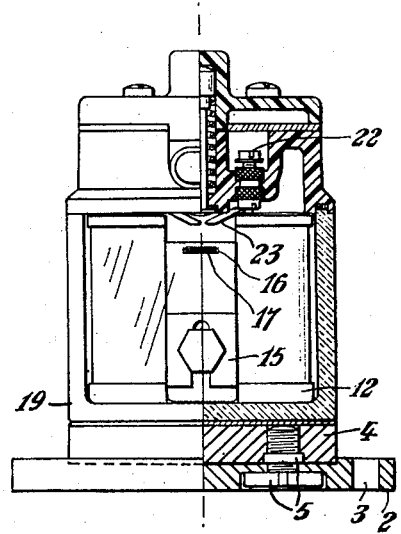
Figure 2 is a view taken from the side of Figure 1, one half being in relief the other in section.
Figure 5:
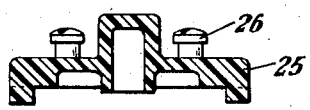
Figure 5 is a plan view of a detail.
Figure 5:
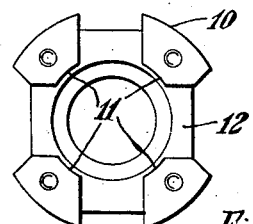
Figure 3:
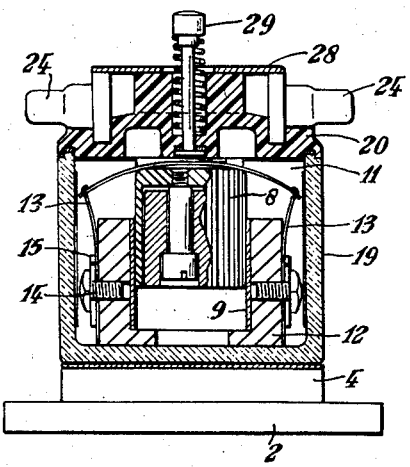
Figure 3 is a substantially similar view to Figure 1 except that the mechanism is shown in the operated position, the end cover terminal block arrangement being shown removed.
Figure 4:
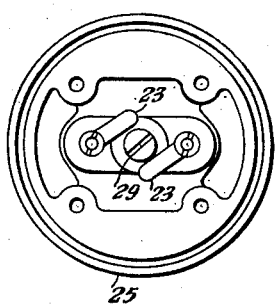
Figure 4 is an underside view of the terminal block of the appliance.

The inertia element or slug is denoted 8 and, as shown in Figure 3, is a rib construction so as to reduce friction in the hard and polished metal mounting sleeve 9, which sleeve is secured in a metal fixture 10, shown in detail in Fig. 5. The fixture 10 comprises four substantially identical lugs 11 and a rectangular base portion 12, to the face portion of which a pair of leaf springs 13 are secured by screws 14 and adjustable clamping pieces 15, which enable the free ends of leaf springs 13 to be lengthened or shortened as desired. The other ends of leaf springs 13 are bent into hook form as shown in Figs. 1 and 3 and are respectively slotted at 16 (Fig. 2), to receive tongue-like ends 17 of a bow spring 18, which normally rests on the free end of slug 8, as shown in Fig. 1.

The mechanism described above is enclosed in a cup shaped container 19 of transparent material and a plastic terminal block device 20, which is shaped to trap a sealing ring or washer 21 so as to form a hermetic seal with cup shaped container 19.

The terminal block device 20 is provided with terminal screws and stud device 22, one of which is shown in Fig. 2, and this is provided with a resilient spring contact 23. Two such contact devices are provided in terminal block 20, whereby electrical connections can be made to the appliance by cable leads entering the terminal block through synthetic rubber or light sealing devices 24, 24, clamped by means of terminal block cover 25 held by screws 26 which engage studs and secure terminal block 20 to lugs 11.

The fixture device comprising parts 10, 11 and 12 is secured by screws 6 to holes in the cup shaped container 19 as shown in Fig. 1, a sealing washer 27 being provided to prevent moisture and the like from entering into the mechanism casing. A sealing washer 28 is provided between terminal block 20 and terminal block cover 25 and a spring urged resetting knob 29 is mounted in terminal block 20. Depression of the knob 29 when the mechanism is in position shown in Fig. 3 will restore the mechanism to the position shown in Fig. 1.

When the appliance is mounted in an aircraft the base plate 2 will normally be substantially vertical to slug 8, the latter being mounted in horizontal position pointing in the direction of flight so that if the aircraft is retarded with deceleration exceeding 3 g the slug 8, in the position shown in Fig. 1 will overcome the action of bow spring 18 and leaf spring 13, taking up the position shown in Fig. 3, in which the bow spring 18 makes contact with spring contacts 23, thereby closing an electrical circuit over these contacts, which may operate a fire extinguisher or an electrical relay which would cause operation of fire extinguishers and similar safety devices.

Inertia element operated appliances are liable to be affected by vibrational effects if applied along the longitudinal axis of slug 8, and it is found that slug 8 may have a natural period of vibration within a frequency range which is likely to be produced in aircraft and this may cause the appliance to operate at the value of g, below 3 g or any other predetermined setting.

To overcome this effect slug 8 is recessed or hollowed out at 8a and is provided with a screwed stud 30 secured in slug 8 upon which a secondary sliding slug 31 is mounted so as to have slight freedom of movement.

By suitably altering the dimensions of slug 8 recess 8a and secondary slug 31 it is possible to damp out vibrational effects at the frequencies which are likely to be met with in aircraft structures and thereby ensure that the appliance will operate at its predetermined setting of g, which is important, as inadvertent operation of inertia switches may have serious effects.

What we claim and desire to secure by Letters Patent is:

1. In an impact operated device for controlling electric switches, automatic fire preventing appliances and the like upon craft and vehicles comprising a tubular member, a movable slug mounted in said tubular member to move into an operative position under the action of deceleration or impact, a second slug mounted inside the slug first mentioned, said second slug having slight freedom of movement for the purpose of damping out vibrations, substantially as described and an electric circuit adapted to be closed when said movable slug is moved into said operative position.

2. In an impact operated device for controlling electric switches, automatic fire preventing and like appliances upon craft and vehicles, the combination of a guide tube, a weight resting in said guide tube, a resilient member normally forming a bow over one end of said guide tube for confining said weight therein, resilient supporting means engaging the ends of said resilient member, a member positioned over said resilient member, a pair of electrical contacts attached to said last mentioned member and positioned over said resilient member so that the electrical circuit between said pair of contacts is closed when said weight springs said resilient member when deceleration or impact is applied to said weight in the appropriate direction.

3. In an impact operated device for controlling electric switches, automatic fire preventing and like appliances upon craft and vehicles, the combination of a guide tube, a weight resting in said guide tube, a resilient member normally forming a bow over one end of said guide tube for confining said weight therein, resilient supporting means engaging the ends of said resilient member, a member positioned over said resilient member, a pair of electrical contacts attached to said last mentioned member and positioned over said resilient member so that the electrical circuit between said pair of contacts is closed when said weight springs said resilient member thereto, and means for adjusting said resilient means to regulate the setting at which said weight will spring said resilient member when deceleration or impact is applied thereto in the appropriate direction.

4. In an impact operated device for controlling electric switches, automatic fire preventing and like appliances upon craft and vehicles, the combination of a guide tube, a weight resting in said guide tube, a resilient member normally forming a bow over one end of said guide tube for confining said weight therein, resilient supporting means engaging the ends of said resilient member attached to the outside of said guide tube, a member positioned over said resilient member, a pair of electrical contacts attached to said last mentioned member and positioned over said resilient member so that the electrical circuit between said pair of contacts is closed when said weight springs said resilient member thereto, and means for adjusting said resilient means to regulate the setting at which said weight will spring said resilient member when deceleration or impact is applied to said weight in the appropriate direction.

5. In an impact operated device for controlling electric switches, automatic fire preventing and like appliances upon craft and vehicles, the combination of a guide tube, a weight resting in said guide tube, a resilient member normally forming a bow over one end of said guide tube for confining said weight therein, resilient supporting members engaging the ends of said resilient member, a member positioned over said resilient member, a pair of electrical contacts attached to said last mentioned member and positioned over said resilient member so that the electrical circuit between said pair of contacts is closed when said weight springs said resilient member thereto, means attaching said resilient supporting members to the outside of said guide tube, said supporting members having slots therein for adjusting the position thereof to regulate the setting at which said weight will spring said resilient member when deceleration or impact is applied thereto in the appropriate direction.

6. An impact operated device according to claim 2 further comprising a second weight mounted inside said first mentioned weight, said second weight having a slight freedom of movement for the purpose of damping out vibrations, substantially as described.

7. A device as set forth in claim 1 further comprising a normally bow-shaped resilient member positioned over said movable slug, a pair of electrical contacts positioned over said resilient member so that the electrical circuit between said pair of contacts is closed when said first mentioned slug springs said resilient member when deceleration or impact is applied to said first mentioned slug in the appropriate direction.

8. A device as set forth in claim 1 further comprising a resilient member positioned over said movable slug to be actuated thereby, said resilient member closing said electric circuit when said resilient member is actuated by said first mentioned slug when deceleration or impact is applied to said first mentioned slug in the appropriate direction.

DOUGLAS A. HANSARD.
NEIL GIBSON BENNETT.

References Cited in the file of this patent

UNITED STATES PATENTS

| Number | Name | Date |
|---|---|---|
| 884,353 | Berry | Apr. 14, 1908 |
| 989,958 | Frahm | Apr. 18, 1911 |
| 1,439,231 | Erickson | Dec. 19, 1922 |
| 1,948,728 | Meginniss | Feb. 27, 1934 |
| 2,302,670 | Buchanan | Nov. 24, 1942 |
| 2,311,637 | Buchanan | Feb. 23, 1943 |
| 2,451,217 | Heinrich | Oct. 12, 1948 |
| 2,475,728 | Smith | July 12, 1949 |
| 2,484,165 | Hathaway | Oct. 11, 1949 |